Oct. 26, 1954 M. GOLDBERG ET AL 2,692,714
MACHINE FOR FORCE FEEDING AND STUFFING COMPACTED
FIBROUS MATERIALS INTO CASINGS
Filed Jan. 25, 1954 3 Sheets-Sheet 1
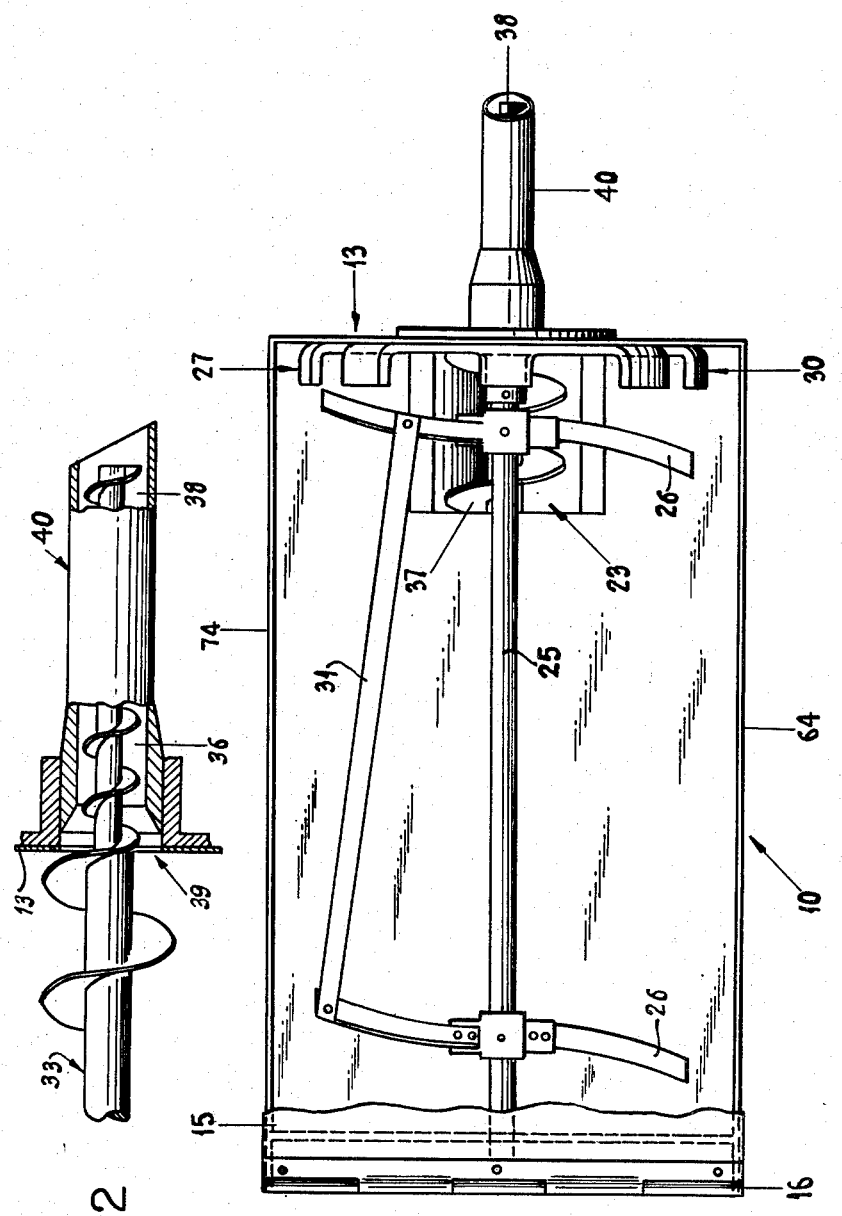
MAX GOLDBERG
ROBERT J. GARWIN
INVENTORS
BY *Joseph Blacker*
ATTORNEY Oct. 26, 1954 M. GOLDBERG ET AL 2,692,714
MACHINE FOR FORCE FEEDING AND STUFFING COMPACTED
FIBROUS MATERIALS INTO CASINGS
Filed Jan. 25, 1954 3 Sheets-Sheet 2

MAX GOLDBERG
ROBERT J. GARWIN
INVENTORS

BY Joseph Blacker

ATTORNEY

Oct. 26, 1954

M. GOLDBERG ET AL 2,692,714

MACHINE FOR FORCE FEEDING AND STUFFING COMPACTED
FIBROUS MATERIALS INTO CASINGS

Filed Jan. 25, 1954

MAX GOLDBERG
ROBERT J. GARWIN
INVENTORS

BY Joseph Blacker

ATTORNEY

Patented Oct. 26, 1954

2,692,714

UNITED STATES PATENT OFFICE 2,692,714

MACHINE FOR FORCE FEEDING AND STUFFING COMPACTED FIBROUS MATERIALS INTO CASINGS

Max Goldberg and Robert J. Garwin, New York, N. Y.

Application January 25, 1954, Serial No. 405,684

6 Claims. (Cl. 226—19)

This invention relates to a force feeding and stuffing machine for feeding compacted fibrous material such as flock or small chopped up pieces of stock into porous or non-porous casings by means of an improved force feeding helical conveyor.

An object of this invention is to provide a force feeding and stuffing machine comprising a chamber or casing for receiving flock type materials, the receiving chamber having an opening in its bottom wall defined by a substantially semi-circular housing providing a pocket below the bottom wall of the receiving chamber, and to mount a helical conveyor preferably below the bottom wall of the receiving chamber, the receiving chamber having a shaft carrying a plurality of agitator arms with a bar which connects the agitator arms and is positioned angularly of the agitator shaft and arranged so that when the agitator shaft rotates, the bar causes motion of the filling material in direction of the pocket.

Another object of this invention is to provide a circular and substantially dished rotor mounted on the agitator shaft with its outer periphery in closely spaced-apart relation from the helical conveyor, and having peripherally spaced arms adapted to move a surplus of the filling material from the conveyor to prevent clogging of the conveyor.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a top plan view of the filling machine with the cover removed and showing the agitator and the conveyor.

Figure 2 is a central cross-sectional view taken through the nozzle and showing a two-step arrangement of the helical force feeding conveyor.

Figures 3, 4:
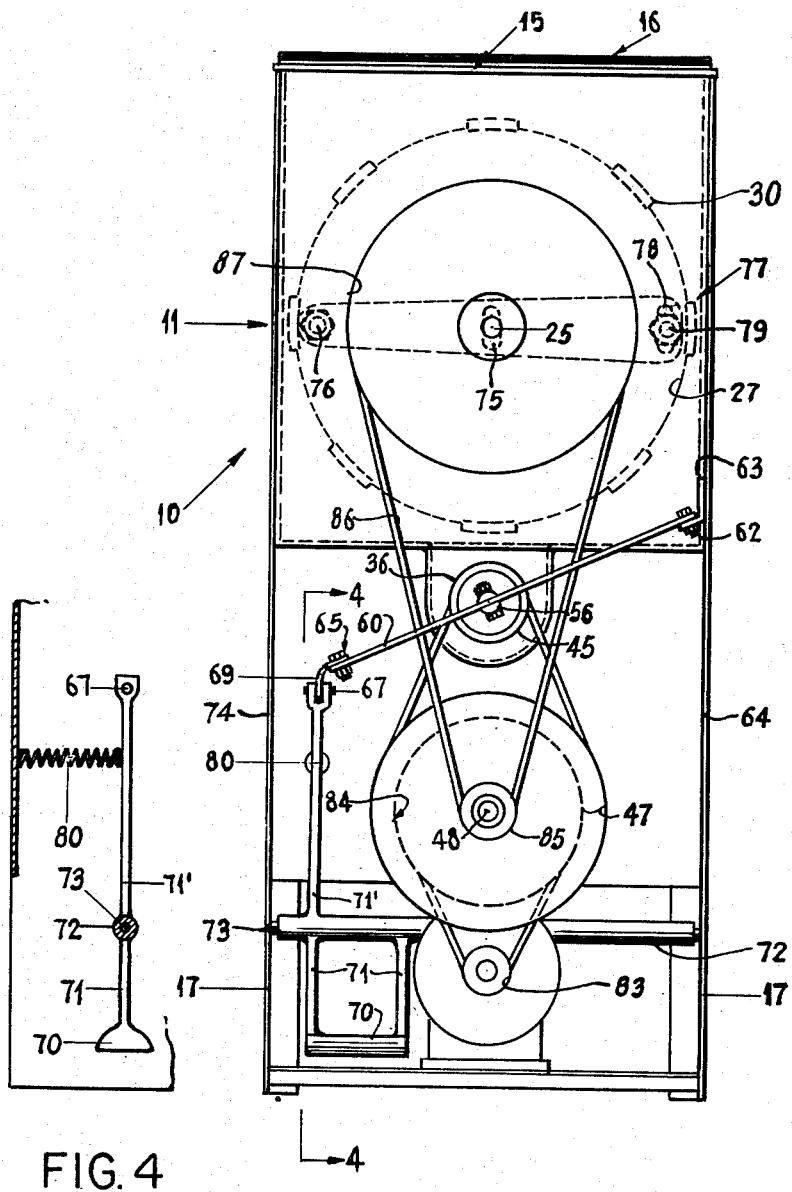
Figure 3 is a rear elevation of the machine shown in Figure 1 and showing means for driving the conveyor shaft and the agitator shaft.
Figure 4 is a fragmentary cross-sectional view taken on line 4—4 in Figure 3, the cross-section being taken at the front or nozzle end of the machine while looking from the rear end thereof.
Figure 5:
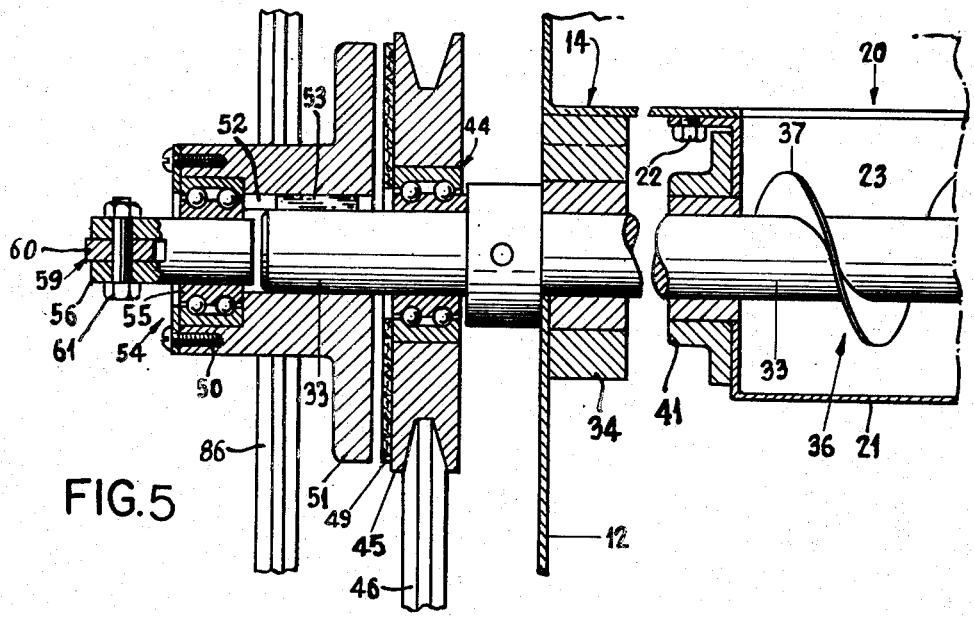
Figure 5 is a central cross-sectional view of clutch mechanism mounted on the conveyor shaft and a portion of the conveyor.
Figure 6:
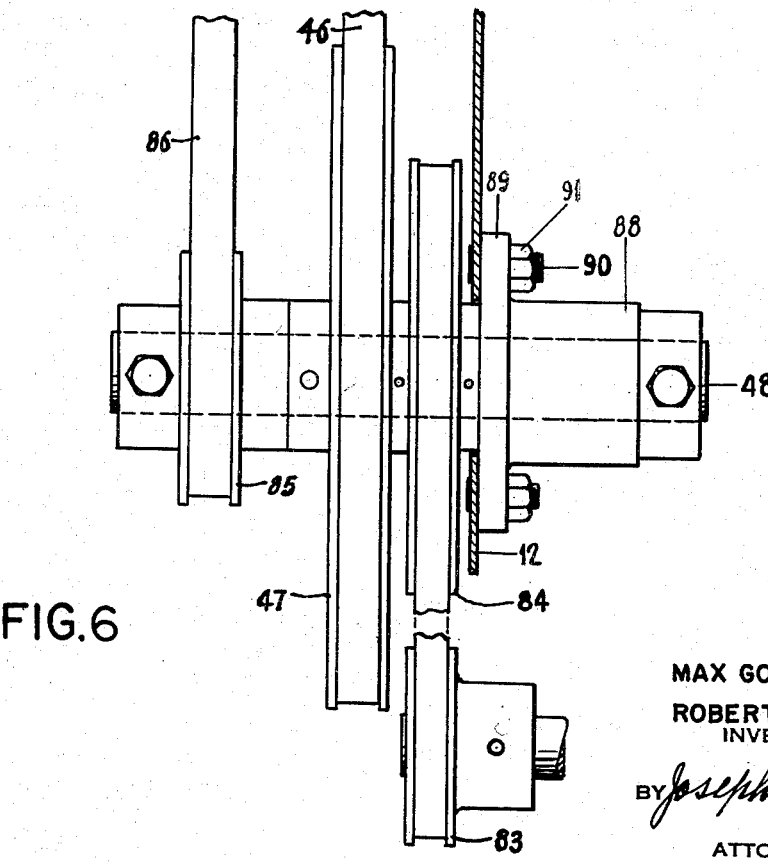
Figure 6 is a vertical elevational view, partly in cross-section and showing the assembly of idler shaft mounted pulleys and a motor drive pulley.

In the illustrated embodiment of the invention, the numeral 10 indicates a machine for feeding and stuffing compacted fibrous material such as flock or small chopped up pieces of cloth into casings such as that used for stuffing toys, dolls, etc., of which the casings may be porous or non-porous.

The machine 10 comprises a closed top rectangular chamber or casing 11 for receiving the filling materials. The receiving chamber 11 has two end walls 12 and 13 and a bottom wall 14. A cover 15 is movably secured to the receiving chamber by a hinge 16. The machine 10 is supported in raised position above a floor by upright legs 17.

In the bottom wall 14, at one end of the receiving chamber 11 is an opening 20 of substantially rectangular form. A semi-circular enclosure 21 is secured to the lower wall 14 below the opening 20 by bolts 22. The lower wall of the semi-circular enclosure 21 defines a pocket 23.

Mounted on a horizontally rotatable agitator shaft 25 in the receiving chamber 11 is a plurality of agitator arms 26. At one end of the receiving chamber 11, the agitator shaft 25 has a circular and substantially dished rotor 27 mounted thereon. The rotor 27 has peripherally spaced arms 30 substantially parallel to the agitator shaft 25. A bar 31 connects the agitator arms 26 and is positioned angularly of the agitator shaft 25 and is arranged so that when the agitator shaft rotates, this bar causes motion of the filling material in direction of the pocket 23 in the enclosure 21.

A conveyor shaft 33 is rotatably mounted in the pocket 23 and supported at one end in a bearing 34. A helical conveyor 36 is suitably secured to the shaft 33. The conveyor is positioned horizontally and centrally of the pocket 23. The conveyor 36 has a helical or screw type blade 37 of the same length as the opening 20. The conveyor 36 is formed with a step-down conveyor extension 38 which extends through an opening 39 in the wall 13, outside the receiving chamber and is rotatably mounted in a tubular nozzle 40 suitably secured to the wall 13. At the pocket 23, the conveyor shaft 33 is rotatably mounted in a bearing 41.

As shown in Figure 3, the lower peripheral portion of the rotor 27 is in close proximity to the helical conveyor 36 and sweeps the collected filling materials that tend to bridge above the conveyor at the opening 20 away from the said opening. This prevents clogging of the conveyor 36 and makes it possible to operate the filling machine 10 with a fractional horsepower electric motor, the motor merely requiring plugging into an electric circuit. Without the clog preventing rotor 27, it is necessary to provide a motor of much greater power.

Mounted at one end of the conveyor shaft 33, at the outer face of the end wall 12 is a ball bearing 44. A pulley 45 is mounted on the ball bearing 44. The pulley 45 is driven by a belt 46 passing over a pulley 47 on an idler shaft 48. Secured to one face of the pulley 45 is a disc-shaped clutch drive element 49.

Slidably mounted at one end of the conveyor shaft 33 is a sleeve 50 having a disc-shaped flange or clutch element 51. The sleeve has a keyway 52 in engagement with a key 53 in the shaft 33. The sleeve 50 is slidable on the shaft 33 to and from the clutch element 49. The sleeve has a central aperture 54 in which is secured a ball type thrust bearing 55. The inner race of the ball thrust bearing is secured to a shaft extension 56 which is mounted coaxially with the shaft 33. The outer race is fixed in the sleeve 50. The shaft extension 56 is normally slightly spaced apart from the end of the shaft 33. The outer end portion of the shaft extension 56 has a slot 59 in which is pivotally mounted a clutch retaining arm 60. The arm 60 is held in position by a bolt 61 passing through the arm and through the shaft extension.

As shown in Figure 3, the clutch retaining arm 60 is mounted in angular relation on the machine 10. One end of the retaining arm is pivotally secured by a bolt 62 to a bracket 63 which is fixed to the side wall 64. The free end of the retaining arm is pivotally connected to a link 65 which extends substantially the entire length of the casing 11.

As the normally stationary co-acting clutch element 51 is keyed to the conveyor shaft 33, it rotates as a unit with the shaft when the clutch element 51 is moved into engagement with the rotating clutch element 49.

At the nozzle end of the machine 10 is a foot pedal 70 having upright arms 71 which are integral with a horizontal tube 72. The tube 72 is pivotally mounted on a rod 73 which is fixed to the side walls 64 and 74 of the casing 11. The foot pedal has an upright arm 71' which is connected to a vertical extension 69 of the link 65 by a pin 67. The foot pedal serves as means, used by the operator, for interengaging the clutch elements 51 and 49, to cause intermittent rotation of the conveyor 36 and the conveyor to intermittently feed a pre-determined quantity of the compacted filling material into a fabric casing mounted in frictional engagement on the nozzle 40.

The rotor 27 may be moved up or down considerably to bring its outer periphery to or from the periphery of the helical conveyor 36 by a lever 77 through the central portion of which the agitator shaft 25 freely passes. At one end, the lever 77 is pivoted on a bolt 76. At the other end, the lever has a slot 78 through which a bolt 79 passes and which, when unthreaded, permits vertical adjustment of the lever 77 and the rotor end of the shaft 25 and the rotor 27 to or from the helical conveyor 36. At the shaft 25, the end wall 13 has an upright shaft clearance slot 75 which permits up or down movement of the shaft in relation to the wall 13.

A coil spring 80 is suitably secured at one end to the foot pedal 70 and at its other end to a wall of the casing 11. The spring assists in keeping the clutch engaging elements in spaced apart relation and the conveyor in non-operating relation.

A motor pulley 83 drives a pulley 84 mounted on the idler shaft 48. The belt 46 passes over the idler shaft pulley 47.

A further pulley 85 mounted on the idler shaft 48 carries a belt 86 which drives a pulley 87 mounted on the agitator shaft 25. The agitator shaft 25 is driven continuously by the motor while the conveyor shaft 33 is driven intermittently and only when the operator actuates the foot pedal 70.

The idler shaft 48 is rotatably mounted in a bearing 88 having an apertured flange 89. Bolts 90 pass through the flange 89 and fix the flange to the end wall 12. Threaded nuts 91 on the bolts 90 secure the parts together.

It is to be noted that one end of the bar 31 may be secured to the rotor 27 whereby a single agitator arm 26 will suffice for supporting the bar 31 for rotation (not shown).

In accordance with the patent statutes we have described and illustrated the preferred embodiment of our invention, but it will be understood that various changes and modifications can be made therein without departing from the spirit of the invention as defined by the appended claims.

We claim:

1. In a processing and force feeding machine for filling casings in step-by-step relation, with particles of fibrous material, a receiving chamber having end walls and a pocket in one of its sides, one end wall defining said pocket being in alinement with an end wall of said chamber, said chamber having a cover for filling said chamber with said fibrous materials, a shaft rotatably mounted in said chamber and having agitator arms mounted at each end thereof, a helical conveyor rotatably mounted in said pocket and in communication with said chamber, a nozzle outside said chamber and in circumscribing relation with said helical conveyor, a bar connecting said agitator arms and positioned angularly of said agitator shaft and thereby causing motion of said materials toward said nozzle, one wall of said pocket passing partially around said conveyor, the alinement of an end wall of said receiving chamber with an end wall of said pocket causing the material being processed to enter said helical conveyor in a direction substantially perpendicular to the axis thereof, a rotor mounted on said agitator shaft in spaced-apart relation from said helical conveyor, and having peripherally spaced arms adapted to move a surplus of said filling material from said conveyor to prevent clogging thereof, said conveyor shaft having a clutch element freely rotatably mounted adjacent an end thereof, a normally stationary clutch element slidably mounted on said shaft in co-acting relation with said rotatable clutch element, said normally stationary clutch element being movable toward said rotatable clutch element to cause rotation of said conveyor shaft, spring means maintaining said clutch elements in disengagement and said conveyor in non-rotating position, and means for engaging said clutch elements to rotate said conveyor and cause said conveyor to feed a predetermined quantity of said filling material from said receiving chamber into a casing slipped over said nozzle.

2. In a processing and force feeding machine for filling casings in step-by-step relation, with particles of fibrous material, a receiving chamber having end walls and a pocket in one of its sides, one end wall defining said pocket being in alinement with an end wall of said chamber, said chamber having a cover for filling said chamber with said fibrous materials, a shaft rotatably mounted in said chamber and having agitator arms mounted at each end thereof, a helical conveyor rotatably mounted in said pocket and in communication with said chamber, a nozzle outside said chamber and in circumscribing relation with said helical conveyor, a bar connecting said agitator arms and positioned angularly of said agitator shaft and thereby causing motion of said materials toward said nozzle, one wall defining said pocket passing partially around said conveyor, the alinement of an end wall of said receiving chamber with an end wall of said pocket causing the material being processed to enter said helical conveyor in a direction substantially perpendicular to the axis thereof, a rotor mounted on said agitator shaft in spaced-apart relation from said helical conveyor, and having peripherally spaced arms adapted to move a surplus of said filling material from said conveyor to prevent clogging thereof, said conveyor shaft having a clutch element freely rotatably mounted adjacent an end thereof and having a pulley integral therewith, means for rotating said pulley, a normally stationary clutch element slidably mounted on said shaft in co-acting relation with said rotatable clutch element, said normally stationary clutch element being movable toward said rotatable clutch element to cause rotation of said conveyor shaft, spring means maintaining said clutch elements in disengagement and said conveyor in non-rotating position, and foot operating means for engaging said clutch elements to rotate said conveyor and cause said conveyor to feed a predetermined quantity of said filling material from said receiving chamber into a casing slipped over said nozzle.

3. In a processing and force feeding machine for filling casings in step-by-step relation, with particles of fibrous material, a receiving chamber having end walls and a pocket in one of its sides, a shaft rotatably mounted in said chamber and having agitator arms mounted at each end thereof, a helical conveyor rotatably mounted in said pocket and in communication with said chamber, a nozzle outside said chamber and in circumscribing relation with said helical conveyor, a bar connecting said agitator arms and positioned angularly of said agitator shaft and thereby causing motion of said filling material toward said nozzle, one wall defining said pocket passing partially around said conveyor, one end wall defining said pocket being in alinement with an end wall of said chamber and thereby causing the material being processed to enter said helical conveyor in a direction substantially perpendicular to the axis thereof, a rotor mounted on said agitator shaft in spaced-apart relation from said helical conveyor, and having peripherally spaced arms adapted to move a surplus of said filling material from said conveyor to prevent clogging thereof, said conveyor shaft having a clutch element freely rotatably mounted thereon adjacent an end thereof and having a co-axial pulley integral therewith, means for continuously rotating said pulley, a normally stationary clutch element slidably mounted on said shaft in co-acting relation with said rotatable clutch element, said normally stationary clutch element being movable toward and into engagement with said rotatable clutch element to cause rotation of said conveyor shaft, spring means maintaining said clutch elements in disengagement and said conveyor in non-rotating position, and foot operating means for engaging said clutch elements to intermittently rotate said conveyor and cause said conveyor to feed a predetermined quantity of said filling material from said receiving chamber into a casing slipped over said nozzle.

4. In a processing and force feeding machine for filling casings in step-by-step relation, with particles of compacted fibrous material, a receiving chamber having end walls and a pocket in one of its sides, a shaft rotatably mounted in said chamber and having agitator arms mounted at each end thereof, a helical conveyor rotatably mounted in said pocket and in communication with said chamber, a nozzle outside said chamber and in circumscribing relation with an end portion of said helical conveyor, a bar connecting said agitator arms and positioned angularly of said agitator shaft and thereby causing motion of said filling material toward said nozzle, one wall defining said pocket passing partially around said conveyor, one end wall defining said pocket being in alinement with an end wall of said chamber, the filling material being fed so as to enter said helical conveyor in a direction substantially perpendicular to the axis thereof, a circular and substantially dished rotor mounted on said agitator shaft with its outer periphery in spaced-apart relation from said helical conveyor, and having peripherally spaced arms adapted to move a surplus of said filling material from said conveyor to prevent clogging thereof, said conveyor shaft having a clutch element freely rotatably mounted thereon adjacent an end thereof and having a pulley integral and co-axially disposed therewith, means for continuously rotating said pulley, a normally stationary clutch element slidably mounted on said shaft into co-acting relation with said rotatable clutch element, said normally stationary clutch element being movable toward and into engagement with said rotatable clutch element to cause rotation of said conveyor shaft, spring means maintaining said clutch elements in disengagement with said conveyor in non-rotating position, and foot operating means for engaging said clutch elements to intermittently rotate said conveyor and cause said conveyor to feed a predetermined quantity of said compacted filling material into a casing slipped over said nozzle.

5. In a processing and force feeding machine for filling casings in step-by-step relation, with particles of compacted fibrous material, a receiving chamber having end walls and a pocket in its lower wall, a shaft rotatably mounted in said chamber and having agitator arms mounted at each end thereof, a helical conveyor rotatably mounted in said pocket and in communication with said chamber, a nozzle outside said chamber and in circumscribing relation with a step-down extension of said helical conveyor, a bar connecting said agitator arms and positioned angularly of said agitator shaft and thereby causing motion of said filling material toward said nozzle, a wall defining said pocket and passing partially around said conveyor, one end wall defining said pocket being in alinement with an end wall of said chamber, filling material entering said helical conveyor in a direction substantially perpendicular to the axis thereof, a circular and substantially dished rotor mounted on said agitator shaft with its outer periphery in closely spaced-apart relation from said helical conveyor, and having peripherally spaced arms adapted to move a surplus of said filling material from said conveyor to prevent clogging thereof, said conveyor shaft having a disk-shaped clutch element freely rotatably mounted thereon adjacent an end thereof and having a pulley integral and co-axially disposed with said element, means for continuously rotating said pulley and said clutch element, a normally stationary disk-shaped clutch element slidably mounted on said shaft into co-acting relation with said rotatable clutch element, said normally stationary clutch element being movable toward and into engagement with said rotatable clutch element to cause rotation of said conveyor, spring means maintaining said clutch elements in disengagement, to permit said conveyor to be stationary, and foot operating means for interengaging said clutch elements to cause intermittent rotation of said conveyor and said conveyor to feed a predetermined quantity of said compacted filling material into a casing slipped over said nozzle.

6. In a stuffing and force feeding machine for filling casings, with compacted filling material, a receiving chamber having end walls, a shaft rotatably mounted in said chamber and having agitator arms, a helical conveyor rotatably mounted in communication with said chamber, a nozzle outside said chamber and in circumscribing relation with said helical conveyor, means causing motion of said filling material toward said nozzle, filling material entering said helical conveyor in a direction substantially perpendicular to the axis thereof, a rotor mounted on said agitator shaft with its outer periphery in closely spaced-apart relation from said conveyor, and having peripherally spaced arms adapted to move a surplus of said filling material from said conveyor to feed and prevent clogging thereof, said conveyor shaft having a clutch element freely rotatably mounted thereon and having a pulley integral and co-axially disposed with said element, means for continuously rotating said pulley and said clutch element, a normally stationary clutch element slidably mounted on said shaft into co-acting relation with said rotatable clutch element, said normally stationary clutch element being movable toward and into engagement with said rotatable clutch element to cause rotation of said conveyor, a clutch actuating arm, spring means maintaining said clutch actuating arm and said clutch elements in disengagement, to permit said conveyor to be stationary, and foot operating means for interengaging said clutch elements to cause rotation of said conveyor and said conveyor to feed a predetermined quantity of said compacted filling material into a casing slipped over said nozzle.

No references cited.